(12) United States Patent
Chung et al.

(10) Patent No.: US 10,182,359 B2
(45) Date of Patent: Jan. 15, 2019

(54) WIRELESS ACCESS POINT APPARATUS AND METHOD FOR TESTING SIGNAL RECEPTION SENSITIVITY

(75) Inventors: Jae Ho Chung, Seoul (KR); Wi Sang Rho, Seoul (KR); Yung Ha Ji, Seongnam-si (KR); Kyu Jeong Han, Suwon-si (KR)

(73) Assignee: KT Corporation, Seongnam (KR)

( * ) Notice: Subject to any disclaimer, the term of this patent is extended or adjusted under 35 U.S.C. 154(b) by 401 days.

(21) Appl. No.: 14/111,992

(22) PCT Filed: Oct. 17, 2011

(86) PCT No.: PCT/KR2011/007716
§ 371 (c)(1),
(2), (4) Date: Oct. 15, 2013

(87) PCT Pub. No.: WO2012/141395
PCT Pub. Date: Oct. 18, 2012

(65) Prior Publication Data
US 2014/0036715 A1 Feb. 6, 2014

(30) Foreign Application Priority Data

Apr. 15, 2011 (KR) .................. 10-2011-0035393

(51) Int. Cl.
*H04W 24/06* (2009.01)
*H04B 17/00* (2015.01)
(Continued)

(52) U.S. Cl.
CPC ........ *H04W 24/06* (2013.01); *H04B 17/0085* (2013.01); *H04B 17/29* (2015.01);
(Continued)

(58) Field of Classification Search
CPC ... H04W 24/06; H04W 52/20; H04W 52/226; H04W 52/262; H04W 52/50; H04B 17/0085
See application file for complete search history.

(56) References Cited

U.S. PATENT DOCUMENTS

| 6,850,740 B1 * | 2/2005 | Haartsen ............... H04L 1/0001 370/330 |
| 8,189,483 B2 * | 5/2012 | Olgaard .............. H04L 12/2602 370/241 |

(Continued)

FOREIGN PATENT DOCUMENTS

| JP | 2004-242076 A | 8/2004 |
| KR | 10-2006-0047806 A | 5/2006 |
| KR | 10-0986871 B1 | 10/2010 |

OTHER PUBLICATIONS

International Search Report of PCT/KR2011/007716, dated Apr. 18, 2012.

*Primary Examiner* — Walter J Divito
*Assistant Examiner* — Anthony Luo
(74) *Attorney, Agent, or Firm* — Sughrue Mion, PLLC

(57) ABSTRACT

A method and apparatus for testing signal reception sensitivity of a wireless access point are provided. The apparatus includes a receiver which is configured to receive a test start request signal, a transmission power level change request signal and a test packet retransmission request signal from a neighboring access point apparatus; a test signal generator which is configured to generate a test packet signal to be transmitted to the neighboring access point apparatus; a transmission power level adjuster which is configured to adjust a transmission power level of the test packet signal; a transmitter which is configured to transmit the test packet signal to the neighboring access point apparatus with a power having a level adjusted by the transmission power (Continued)

level adjuster; and a test executor which is configured to execute a test program having a predetermined sequence for testing a signal reception sensitivity of the neighboring access point apparatus.

20 Claims, 4 Drawing Sheets

(51) Int. Cl.
    *H04W 52/20*     (2009.01)
    *H04B 1/00*     (2006.01)
    *H04W 52/22*     (2009.01)
    *H04W 52/26*     (2009.01)
    *H04W 52/50*     (2009.01)
    *H04B 17/29*     (2015.01)

(52) U.S. Cl.
    CPC .......... *H04W 52/20* (2013.01); *H04W 52/226* (2013.01); *H04W 52/262* (2013.01); *H04W 52/50* (2013.01)

(56) References Cited

U.S. PATENT DOCUMENTS

| | | | |
|---|---|---|---|
| 8,286,176 B1* | 10/2012 | Baumback | H04L 47/70 709/221 |
| 2002/0049068 A1* | 4/2002 | Koo | H04L 1/1671 455/522 |
| 2003/0161341 A1 | 8/2003 | Wu et al. | |
| 2004/0185845 A1* | 9/2004 | Abhishek | H04W 88/08 455/422.1 |
| 2006/0046709 A1 | 3/2006 | Krumm et al. | |
| 2009/0109885 A1* | 4/2009 | Fonseca, Jr. | H04L 1/1825 370/311 |
| 2010/0309876 A1* | 12/2010 | Khandekar | H04L 5/0037 370/330 |
| 2011/0026441 A1* | 2/2011 | Diener | H04N 7/148 370/260 |
| 2011/0142100 A1* | 6/2011 | Farmer | G01S 5/0215 375/148 |
| 2011/0167291 A1* | 7/2011 | Liu | H04W 52/20 713/340 |
| 2011/0223950 A1* | 9/2011 | Shibuya | H04W 52/265 455/501 |

* cited by examiner

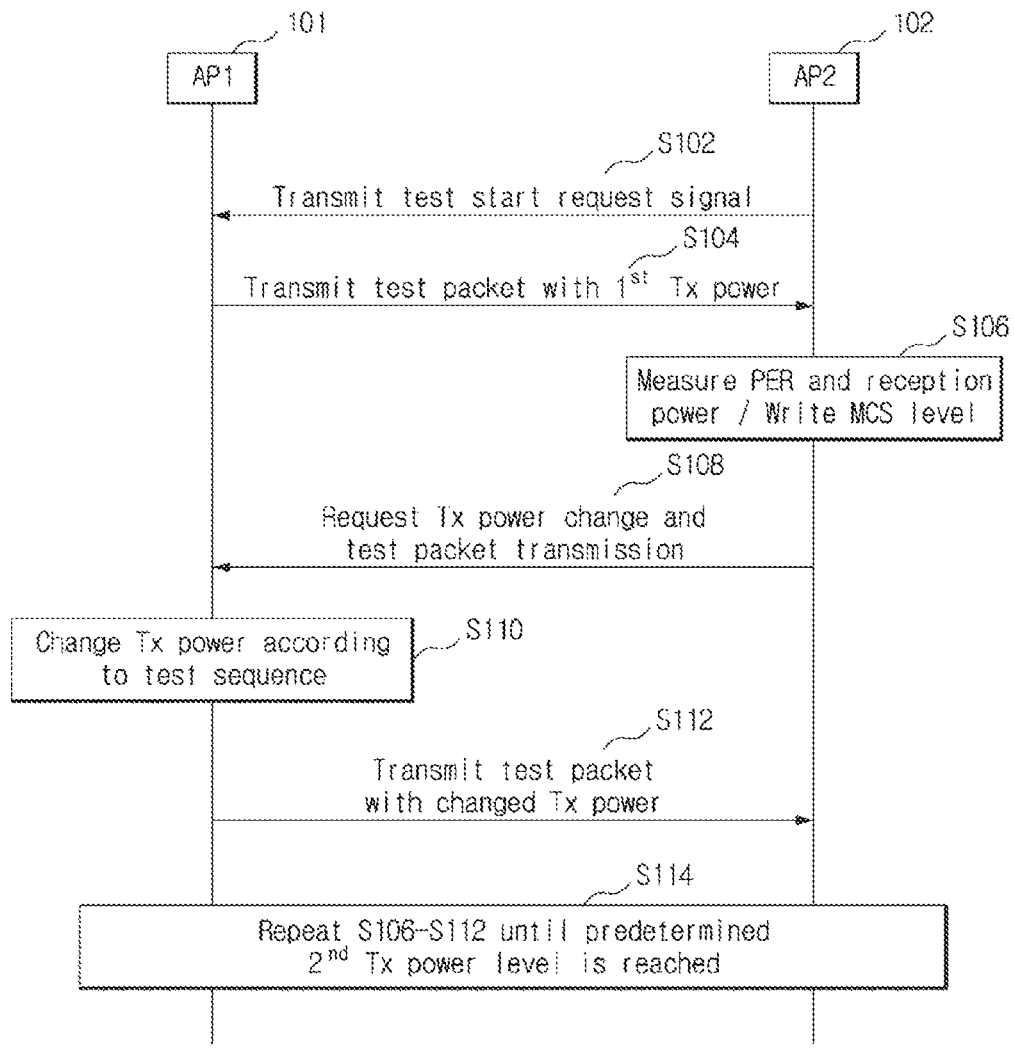

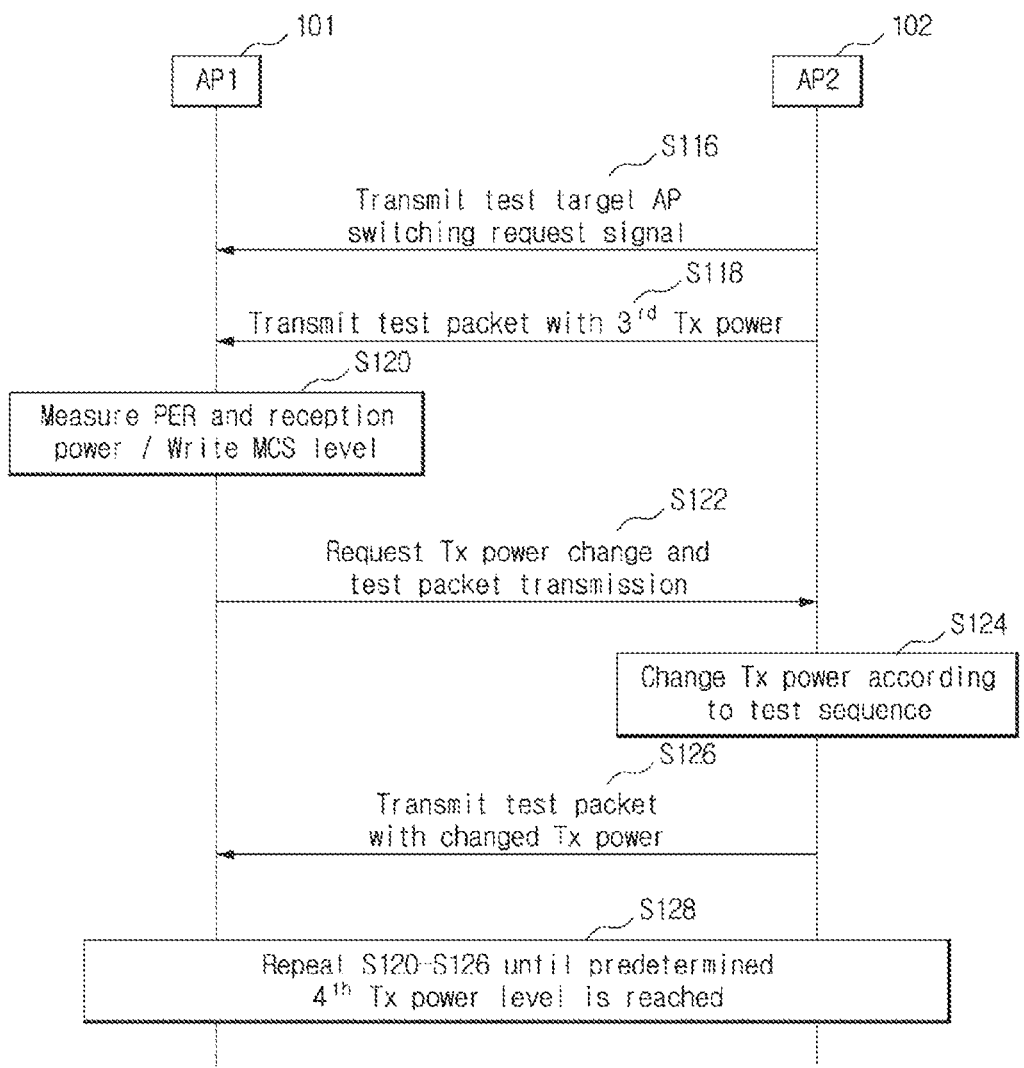

WIRELESS ACCESS POINT APPARATUS AND METHOD FOR TESTING SIGNAL RECEPTION SENSITIVITY

RELATED APPLICATIONS

This is a national stage application of PCT/KR2011/007716 filed on Oct. 17, 2011 which claims priority from Korean Patent Application No. 10-2011-0035393, filed on Apr. 15, 2012, in the Korean Intellectual Property Office, the disclosures of which are hereby incorporated herein in their entirety by reference.

BACKGROUND

1. Field

Exemplary embodiments relate to a wireless access point apparatus, more specifically to an apparatus and a method for testing the performance of a wireless access point apparatus through cooperation among neighboring access points.

2. Related Art

Recently, wireless network environments have been increasingly popular due to the advancement of wireless communication technologies. For example, the Wireless Local Area Network (WLAN) technology such as Institute of Electrical and Electronics Engineers (IEEE) 802.11 has been propagated to replace the wired LAN. The IEEE 802.11 WLAN features the same level of networking as the wired LAN by the use of Radio Frequency (RF) technology in the 2.4 GHz band, called the Industrial Scientific Medical (ISM) band, without using a cable. The IEEE 802.11 WLAN is available in two transmission modes of Infrastructure Networking and Ad-Hoc Networking.

The Ad-Hoc Networking mode creates a network with devices having WLAN and that are not connected with an outside network. Since the Ad-Hoc Networking mode allows communication among WLAN devices only, the Ad-Hoc Networking mode is mainly used for configuring a small office or a small network. The Infrastructure Networking mode is available in an environment that is the same as the wired LAN within an office, and configures the WLAN by connecting an access point, which is a wired/wireless access relay device, to a wired network (e.g., Ethernet, etc.). The access point bridges a WLAN device to a wired LAN device to enable data communication with one another. Moreover, in case communication is made with another WLAN device, wireless communication is possible through an access point, called "infrastructure mode."

A very large number of access points (AP) have been recently installed at various locations, owing to the universal expansion of Wi-Fi environments. However, in order to test the reception performance of a wireless AP apparatus, such as a Wi-Fi AP, the tester has to carry particular testing equipment to the location where the pertinent AP is installed and physically connect the testing equipment to the AP. Accordingly, it takes a significant amount of time and cost to check the AP. Moreover, the operation of the AP has to be stopped while the pertinent AP is tested.

SUMMARY

Exemplary embodiments provide a wireless access point apparatus and a method for testing the access point that allows neighboring access points to the test signal reception sensitivity based on a predetermined sequence through the switching of transmission/reception modes between each other.

According to an aspect of an exemplary embodiment, a method for testing a signal reception sensitivity of a wireless access point apparatus is provided. The method includes: (a) transmitting a predetermined test packet from a first access point apparatus to a second access point apparatus, the predetermined test packet being transmitted at a predetermined first transmission power level; (b) measuring a packet error rate of the test packet and writing a Modulation and Coding Scheme (MCS) level applied to the test packet, the packet error rate being measured and the MCS level being written by the second access point apparatus; (c) transmitting a request for changing a transmission power level for transmitting a test packet from the second access point apparatus to the first access point apparatus; (d) transmitting another test packet with a changed transmission power level from the first access point apparatus to the second access point apparatus; and (e) repeating the operations (b) to (d) until the changed transmission power level reaches a predetermined second transmission power level.

The method can also include, after the operations (a) to (e) are completed: (f) transmitting a test target AP switching request signal from the second access point apparatus to the first access point apparatus; (g) transmitting another test packet from the second access point apparatus to the first access point apparatus with a predetermined third transmission power level after transmitting the test target AP switching request signal; (h) measuring a packet error rate of the test packet transmitted in (g) and writing an MCS level applied to the test packet transmitted in (g), the packet error rate being measured and the MCS level being written by the first access point apparatus; (i) transmitting a request for changing the transmission power level from the first access point apparatus to the second access point apparatus; (j) transmitting another test packet with a changed transmission power level from the second access point apparatus to the first access point apparatus; and (k) repeating the operations (h) to (j) until the changed transmission power level reaches a predetermined fourth transmission power level.

The method can also include: measuring a reception power after receiving the test packet, the reception power being measured by the second access point apparatus; and evaluating a signal reception sensitivity of the second access point apparatus based on whether the packet error rate of the test packet of the MCS level is smaller than or equal to a predetermined reference value for the measured reception power.

Operation (b) may also include checking for a variable MCS level in the measured reception power level based on a pre-stored MCS table if the packet error rate is smaller than or equal to the predetermined reference value, the variable MCS level being checked for by the second access point apparatus, operation (c) may also include transmitting information on the variable MCS level from the second access point apparatus to the first access point apparatus, and operation (d) may also include changing an MCS level to apply to a test packet based on the received information on the MCS level, the MCS level being changed by the first access point apparatus.

The method can also include: measuring a reception power at the time of or after receiving the test packet transmitted in operation (g), the reception power being measured by the first access point apparatus; and evaluating a signal reception sensitivity of the first access point apparatus based on whether the packet error rate of the test packet of the received MCS level is smaller than or equal to a predetermined reference value for the measured reception power, the signal reception sensitivity being evaluated by the first access point apparatus.

Operation (h) may also include checking for a variable MCS level in the measured reception power level based on a pre-stored MCS table if the packet error rate of the test packet received by the first access point apparatus is smaller than or equal to the predetermined reference value, the variable MCS level being checked for by the first access point apparatus, operation (i) may also include transmitting information on the variable MCS level from the first access point apparatus to the second access point apparatus, and operation (j) may also include changing an MCS level to apply to a test packet based on the received information on the MCS level, the MCS level being changed by the second access point apparatus.

According to an aspect of another exemplary embodiment, a wireless access point apparatus is provided. The wireless access point includes: a reception unit configured for receiving a test start request signal, a transmission power level change request signal and a test packet retransmission request signal from a neighboring access point apparatus; a test signal generation unit configured for generating a test packet signal to be transmitted to the neighboring access point apparatus; a transmission power level adjustment unit configured for adjusting a transmission power level of the test packet signal; a transmission unit configured for transmitting the test packet signal to the neighboring access point apparatus with a power having a level adjusted by the transmission power level adjustment unit; and a test execution unit configured for executing a test program having a predetermined sequence for testing a signal reception sensitivity of the neighboring access point apparatus. Here, the test execution unit can be configured for: controlling the test signal generation unit, the transmission power level adjustment unit and the transmission unit to transmit a predetermined test packet to the neighboring access point apparatus with the power having a predetermined first transmission power level if the test start request signal is received; and changing a transmission power level based on the test program and transmitting a test packet having the changed transmission power level to the neighboring access point apparatus in response to receiving the transmission power level change request signal and the test packet retransmission request signal.

The wireless access point apparatus can also include: a measurement unit configured for measuring a reception power at the time of or after receiving the test packet and measuring a packet error rate of the test packet if the reception unit receives the test packet from the neighboring access point apparatus; an MCS level recording unit configured for recording an MCS level applied to the test packet; and a reception sensitivity evaluation unit configured for evaluating a signal reception sensitivity based on whether the packet error rate of the test packet of the MCS level is smaller than or equal to a predetermined reference value for the measured reception power.

In case the packet error rate has a value that is smaller than or equal to the predetermined reference value, the reception sensitivity evaluation unit can be configured for checking for a variable MCS level that is applicable for the measured reception power level, based on a pre-stored MCS table.

The test execution unit can be configured for transmitting information on the variable MCS level to the neighboring access point apparatus through the transmission unit.

According to an exemplary embodiment, neighboring access point apparatuses can automatically test the signal reception sensitivity according to a predetermined sequence through switching their transmission/reception modes with each other.

Accordingly, service providers may test the reception performance of wireless access point apparatuses without using a wired connection method through the use of additional test equipment, saving the costs and efforts for inspecting and maintaining the wireless access point apparatuses.

BRIEF DESCRIPTION OF THE DRAWINGS

FIG. 3 and FIG. 4 show how the method for testing signal reception sensitivity is performed in accordance with an exemplary embodiment.

DETAILED DESCRIPTION OF EXEMPLARY EMBODIMENTS

Since there can be a variety of permutations and embodiments of the exemplary embodiments, certain exemplary embodiments will be illustrated and described with reference to the accompanying drawings. This, however, does not restrict the inventive concept to certain exemplary embodiments, and shall be construed as including all permutations, equivalents and substitutes covered by the ideas and scope of the exemplary embodiments.

Throughout the description of the exemplary embodiments, when describing a certain relevant technology, details not pertinent to the exemplary embodiments may be omitted. Terms such as "first" and "second" can be used in describing various elements, but the above elements shall not be restricted to the above terms. The above terms are used only to distinguish one element from the other.

When one element is described as being second" can be used in describing various elements, but the above elements shall not be restricted to the above terms. The above terms are used only to distinguish one element from each other, unless otherwise disclosed.

Hereinafter, exemplary embodiments will be described in detail with reference to the accompanying drawings.

Figure 1:
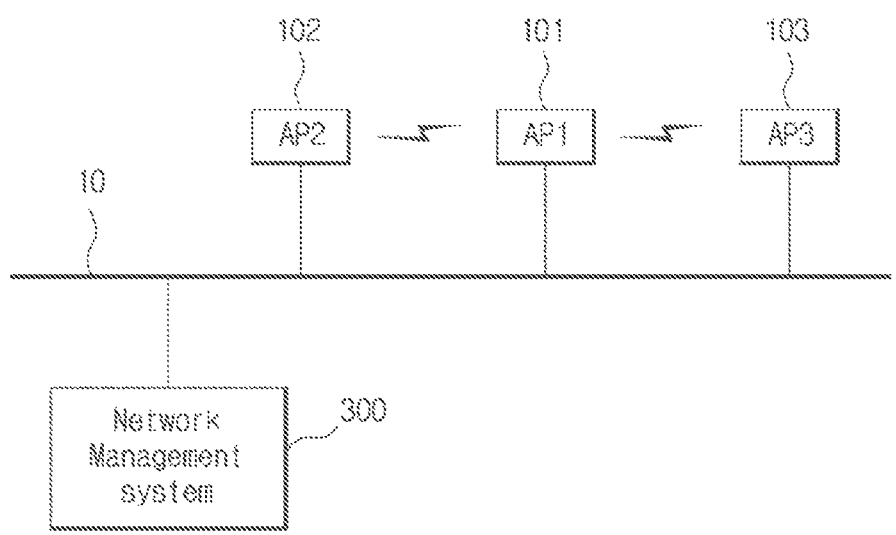
FIG. 1 shows a general condition to which a method for testing signal reception sensitivity in accordance with an exemplary embodiment is applied.

FIG. 1 shows a general condition to which a method for testing signal reception sensitivity in accordance with an exemplary embodiment is applied.

In FIG. 1, three access point apparatuses (AP1 101, AP2 102 and AP3 103) are presented as a simple example for describing the method for testing signal reception sensitivity of a wireless access point apparatus in accordance with an exemplary embodiment.

Here, AP1 101, AP2 102 and AP3 103 can be accessed using a wired network 10 for communication by being physically connected to the wired LAN 10 or by way of another wired LAN device (not shown) in between. In the latter case, the wired LAN device is physically connected with the wired network 10, and the wired LAN device and each of the access point apparatuses 101-103 can be connected with each other through a wireless LAN. Here, each of the access point apparatuses 101-103 can be a Wi-Fi AP.

Moreover, each of the access point apparatuses 101-103 may communicate with a network administration system 300 by being connected with the wired network 10, as described above by way of an example.

In a method for testing the reception performance of each wireless access point apparatus in accordance with an exemplary embodiment, each access point apparatus tests the reception performance of the access point apparatuses through cooperation with neighboring access point apparatuses within its own wireless communication coverage. This is briefly described hereinafter in an exemplary embodiment.

For the convenience of description, it will be assumed that the neighboring AP apparatuses within the wireless communication coverage of AP1 101 are AP2 102 and AP3 103, the neighboring AP apparatus within the wireless communication coverage of AP2 102 is AP1 101, and the neighboring AP apparatus within the wireless communication coverage of AP3 103 is AP1 101.

Accordingly, in the above case, AP1 101 and its neighboring AP apparatus AP2 102 cooperate with each other, and AP1 101 functions as a transmission AP and transmits a predetermined test packet signal to AP2 102, which functions as a reception AP, so that the reception AP2 102 can test and evaluate its own reception performance based on the received test packet signal. Then, the functions of transmission AP and reception AP are reversed, allowing AP2 102 to function as the transmission AP and AP1 101 to function as the reception AP, and AP2 102 transmits the test packet signal to AP1 101 so that the reception AP1 101 can test and evaluate its own reception performance based on the received test packet signal.

Figure 2:
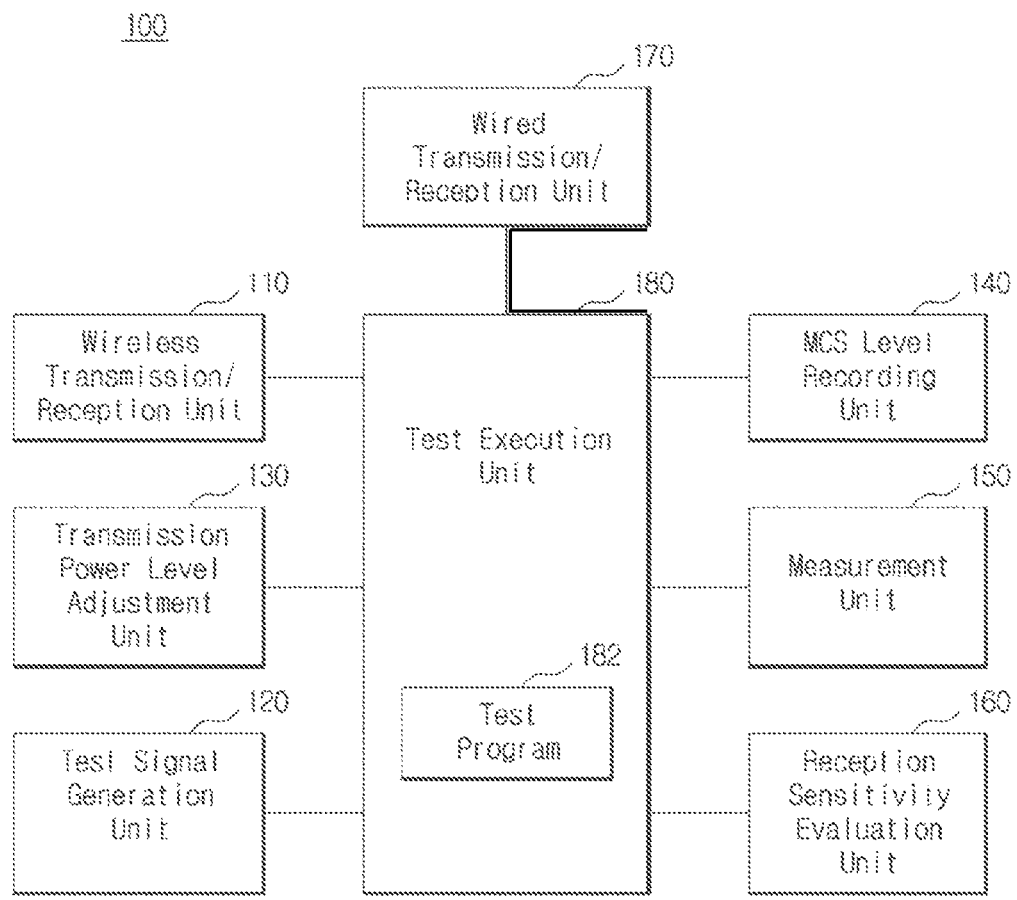
FIG. 2 is a block diagram showing an access point apparatus with which the method for testing signal reception sensitivity is performed in accordance with an exemplary embodiment.

The above exemplary method of testing the reception performance through switching the transmission and reception modes between two neighboring AP apparatuses can be also performed for any other two neighboring AP apparatuses (e.g., AP1 101 and AP3 103) shown in FIG. 1. As such, in order to perform the method of testing the reception performance through switching the transmission and reception modes between any two neighboring AP apparatuses, each AP apparatus can be configured as shown in FIG. 2 in accordance with an exemplary embodiment FIG. 2 is a block diagram showing an access point apparatus with which the test method in accordance with an exemplary embodiment is performed. Here, since the block diagram of FIG. 2 can be applied to every AP apparatus 101-103 shown in FIG. 1, the AP apparatuses will be collectively assigned with reference numeral 100 in FIG. 2.

Referring to FIG. 2, a wireless access point apparatus 100 in accordance with an exemplary embodiment can include a wireless transmission/reception unit 110 (e.g., a wireless transceiver, etc.), a wired transmission/reception unit 170 (e.g., a wired transceiver, etc.), a test signal generation unit 120 (e.g., a test signal generator, etc.), a transmission power level adjustment unit 130 (e.g., a transmission power level adjuster, etc.), an MCS level recording unit 140 (e.g., an MCS level recorder, etc.), a measurement unit 150 (e.g., a measurer, etc.), a reception sensitivity evaluation unit 160 (e.g., an reception sensitivity evaluator, etc.) and a test execution unit 180 (e.g., a test executor, etc.). Here, the wired transmission/reception unit 170 can be omitted if the access point apparatus 100 is connected with the wired network 10 by way of another wired LAN device (not shown).

Here, it shall be appreciated that the block diagram of FIG. 2 merely shows the elements that are related to executing the method of testing signal reception sensitivity in accordance with an exemplary embodiment and is not intended to exclude other essential elements required for performing functions of the access point apparatus.

Hereinafter, each element will be briefly described with respect to its function. Specific functions of each element contributing to performing the method of testing reception signal sensitivity in accordance with an exemplary embodiment will be described in more detail later with reference to FIG. 3 and FIG. 4.

The wireless transmission/reception unit 110 performs communication with other wireless devices that are present within the wireless communication coverage of the wireless access point apparatus. Particularly, the wireless transmission/reception unit 110 handles transmission and reception of a wireless signal for testing the reception performance through cooperation with a neighboring AP.

Specifically, in case the access point apparatus 100 functions as a transmission AP when the testing method in accordance with an exemplary embodiment is performed, the wireless transmission/reception unit 110 receives a test start request signal, a transmission power level change request signal and a test packet retransmission signal. Moreover, in this case, the wireless transmission/reception unit 110 performs a function of transmitting the test packet signal to the neighboring AP with the level of transmission power adjusted by the transmission power level adjustment unit 130.

In case the access point apparatus 100 functions as a reception AP when the testing method in accordance with an exemplary embodiment is performed, the wireless transmission/reception unit 110 performs a function of transmitting the test start request signal to a neighboring AP and receiving a test packet signal from the neighboring AP.

The test signal generation unit 120 performs a function of generating a predetermined test packet signal to be transmitted to a neighboring AP, in case the access point apparatus 100 functions as a transmission AP.

The transmission power level adjustment unit 130 performs a function of adjusting a transmission power level of the test packet signal according to a transmission power level change request and a test packet retransmission request received from a neighboring AP, in case the access point apparatus 100 functions as a transmission AP.

The test execution unit 180 executes a test program 180 having a predetermined sequence for testing the signal reception sensitivity of a neighboring AP. For this, the test execution unit 180 can control the test signal generation unit 120, the transmission power level adjustment unit 130 and the wireless transmission/reception unit 110.

That is, the test execution unit 180 allows a predetermined test packet to be transmitted to a neighboring AP with the power having a predetermined transmission power level, after the test start request signal is received. Moreover, whenever the transmission power level change request signal and the test packet retransmission request signal are received from the neighboring AP, the test execution unit 180 can change the transmission power level based on the test program and allow the test packet having the changed transmission power level to be transmitted to the neighboring AP.

The MCS level recording unit 140 records an MCS (Modulation and Coding Scheme) level applied to the test packet signal received from a neighboring AP, in case the access point apparatus 100 functions as a reception AP.

The measurement unit 150 measures reception power at the time of receiving the test packet from the neighboring AP and measures a packet error rate of the test packet, in case the access point apparatus 100 functions as a reception AP.

The reception sensitivity evaluation unit 160 can evaluate the signal reception sensitivity based on whether the packet error rate of the test packet received from the neighboring AP (i.e., the test packing having a particular MCS level and a particular transmission power) is smaller than or equal to a predetermined reference value at the measured reception power, in case the access point apparatus 100 functions as a reception AP.

Moreover, in case the measured packet error rate has a value that is smaller than or equal to a predetermined reference value, the reception sensitivity evaluation unit 160 can check for a variable MCS level that is applicable for the measured reception power level, based on a pre-stored MCS table. In such a case, the test execution unit 180 can transmit information on the variable MCS level to the neighboring AP through the wireless transmission/reception unit 110.

Hereinafter, the method of testing signal reception sensitivity of a wireless access point apparatus in accordance with an exemplary embodiment will be described in more detail with reference to FIG. 3 and FIG. 4. Through the description of FIG. 3 and FIG. 4, the roles and function of the elements illustrated in the block diagram of FIG. 2 will be understood more clearly.

For the convenience of description and understanding, the method of testing signal reception sensitivity will be described using two AP apparatuses of AP1 101 and AP2 102 only.

In describing the testing method in accordance with an exemplary embodiment, FIG. 3 is a flow diagram showing when AP1 101 functions as a transmission AP and AP2 102 functions as a reception AP.

In operation S102, the reception AP2 102 transmits a test start request signal to the neighboring AP1 101. The test start request signal can be transmitted to AP1 101 at a predetermined time period according to a test program of AP2 102. For example, the test program can be programmed to start testing automatically during dawn hours, when a wireless LAN is little used.

Although it is assumed in the present exemplary embodiment that the reception AP transmits the test start request signal to the transmission AP to start the test, it is also possible that the transmission AP transmits the test start request signal to the reception AP to start the test. However, the following description will be made under the assumption of the former case.

In operation S104, once AP1 101 receives the test start request signal transmitted by the neighboring AP2 102, the transmission AP1 101 transmits a test packet predetermined according to the test program to the reception AP2 102 with a predetermined first transmission power level of power.

Here, the test packet refers to a data packet that is predetermined between neighboring AP apparatuses in order to execute a test in accordance with an exemplary embodiment. Moreover, the first transmission power level is a power level of a signal to be initially transmitted to the reception AP upon the start of the test and can be predetermined according to the test program. For instance, in case a power level within a certain range based on the maximum transmission power of the transmission AP is selected as a power level range required for the test, the smallest power level value thereof can be determined as the signal level (that is, the first transmission power level) to be initially transmitted.

Here, the test packet to be transmitted is transmitted to the reception AP after being modulated and encoded to a specific MCS level that is determined according to the test program.

In operation S106, once the test packet having the first transmission power level is received from the transmission AP1 101, the reception AP2 102 measures the packet error rate (PER) of the received test packet and the reception power of the reception signal. Moreover, AP2 102 records the MCS level applied to the received test packet.

In operation S108, once the measuring and recording are completed, the reception AP2 102 requests the transmission AP1 101 for changing the transmission power level and retransmitting the test packet.

Accordingly, in operation S110, the transmission AP1 101 changes the transmission power level with which the test packet is to be transmitted, and in operation S112, the transmission AP1 101 retransmits the test packet to the reception AP2 102 with the changed transmission power level. In this case, the reception AP2 102 repeats operation S106 of measuring the PER and the reception power and recording the MCS level for the test packet transmitted with the changed transmission power level.

The requesting for changing the transmission power level (i.e., test packet retransmission request; operation S108), the change of the transmission power level and retransmission of test packet with the changed transmission power level (operations S110 and S112) and the measuring of the PER and the reception power and recording of the MCS level (operation S106) can be repeated until a test sequence defined in the test program is completed (refer to operation S114).

In an example, the above operations can be repeated until the transmission power level of the test packet transmitted by the transmission AP reaches a predetermined second transmission power level, which can be a maximum transmissible power of the transmission AP.

In other words, in an exemplary embodiment, for testing the signal reception sensitivity of the reception AP, the same test packet is repeatedly transmitted from the transmission AP to the reception AP by increasing the transmission power level within a predetermined power level range (i.e., from a minimum transmission power level to a maximum transmission power level in the range), and the PER and reception power of the test packet transmitted repeatedly by changing the transmission power level are measured and the MCS level is recorded.

Here, the reception AP can evaluate whether the signal reception sensitivity is normal, based on the measured PER and reception power and the recorded MCS level. Used for the evaluation of the signal reception sensitivity can be, for example, an MCS table shown in Table 1 below.

TABLE 1

Table 20-22-Receiver minimum input level sensitivity

| Modulation | Rate (R) | Adjacent channel rejection (dB) | Nonadjacent channel rejection (dB) | Minimum sensitivity (20 MHz channel spacing) (dBm) | Minimum sensitivity (40 MHz channel spacing) (dBm) |
|---|---|---|---|---|---|
| BPSK | 1/2 | 16 | 32 | −82 | −79 |
| QPSK | 1/2 | 13 | 29 | −79 | −76 |
| QPSK | 3/4 | 11 | 27 | −77 | −74 |
| 16-QAM | 1/2 | 8 | 24 | −74 | −71 |
| 16-QAM | 3/4 | 4 | 20 | −70 | −67 |

TABLE 1-continued

Table 20-22-Receiver minimum input level sensitivity

| Modulation | Rate (R) | Adjacent channel rejection (dB) | Nonadjacent channel rejection (dB) | Minimum sensitivity (20 MHz channel spacing) (dBm) | Minimum sensitivity (40 MHz channel spacing) (dBm) |
|---|---|---|---|---|---|
| 64-QAM | 2/3 | 0 | 16 | −66 | −63 |
| 64-QAM | 3/4 | −1 | 15 | −65 | −62 |
| 64-QAM | 5/6 | −2 | 14 | −64 | −61 |

Here, the above Table 1 is an example of the MCS table defined in IEEE 802.11n, which is the technical standard for WLAN technology. The following is the description of an example of how the reception sensitivity is evaluated with reference to the fifth column and the first/second columns of the above table.

The MCS table show in Table 1 indicates that a reception side standard requires the MCS level to guarantee QPSK 3/4 to be within the PER of 10% if, for example, the signal reception power on the reception side is −77 dBm in the case of 20 MHz channel.

Accordingly, the reception AP can evaluate the signal reception sensitivity based on whether the PER of a test packet having a particular MCS level applied thereto has a value that is smaller than or equal to a predetermined reference value (e.g., 10%). For example, it can be inferred that the reception sensitivity is out of a normal range if the reception power measured at the reception AP satisfies −77 dBm but the PER is 10% or greater when a test packet having the MCS level of QPSK 3/4 applied thereto is transmitted from the transmission AP.

Moreover, the reception AP can check for a variable MCS level in the measured reception power level, based on the measured PER and reception power value. For example, if the reception power measured at the reception AP is −66 dBm and the PER is 10% or less when the test packet is transmitted from the transmission AP by applying the MCS level of QPSK 3/4, it can be inferred that the maximum variable MCS level is 64-QAM 2/3. As such, the checked variable MCS level can be transmitted to the transmission AP, and accordingly, the transmission AP can vary the MCS level to be applied to the test packet.

Hitherto, the case of testing the reception sensitivity of AP2 102 when the AP1 101 functions as a transmission AP and AP2 102 functions as a reception AP has been described with reference to FIG. 3. Hereinafter, described with reference to FIG. 4 will be the case of testing the reception sensitivity of AP1 101 by switching the transmission AP and the reception AP with each other after the test according to FIG. 3 is completed. However, as described above, any description that is redundant with FIG. 3 will be omitted because FIG. 4 has the same or similar operations as FIG. 3, except for switching the transmission AP and the reception AP with each other.

Once the testing of the reception sensitivity of AP2 102 is completed according to the flow diagram shown in FIG. 3, AP2 102, which was previously the reception AP, transmits a test target AP switching request signal to AP1 101, in operation S116. Accordingly, AP2 102 becomes to function as the transmission AP, and AP1 101 becomes to function as the reception AP.

In operation S118, after receiving the test target AP switching request signal, AP2 102 transmits a test packet to the reception AP1 101 with a predetermined third transmission power level. Here, the test packet can be the same as the test packet described with reference to FIG. 3 or a predetermined new data packet. The third transmission power level is the initial transmission power level that is predetermined by the test program and is the same or similar to the description provided with reference to FIG. 3, and thus the description thereof will be omitted.

In operation S120, once the test packet is received from AP2 102, AP1 101 measures the PER and reception power of the test packet and writes the MCS level applied to the received test packet.

In operation S122, once the above operation is completed, the reception AP1 101 requests the transmission AP2 102 for changing the transmission power level and retransmitting the test packet. Accordingly, the transmission AP2 102 changes the transmission power level according to a test sequence programmed in the test program and retransmits the test packet to the reception AP1 101 (operations S124 and S126). As described earlier, these operations can be repeated until the transmission power level reaches a predetermined fourth transmission power level, which can be a maximum transmissible power of AP2 102 (refer to operation S128).

According to the above operations, the reception AP1 101 can test and evaluate the reception sensitivity. As the method of evaluating the reception sensitivity can be identical to FIG. 3, the detailed description thereof will be omitted.

As such, according to an exemplary embodiment, the reception performance of wireless access point apparatus can be tested and evaluated by use of a test sequence (test scenario) according to a predetermined test program, without the use of particular test equipment, by switching the transmission and reception modes for testing the reception sensitivity between neighboring AP apparatuses.

While not restricted thereto, an exemplary embodiment can be embodied as computer-readable code on a computer-readable recording medium. The computer-readable recording medium is any data storage device that can store data that can be thereafter read by a computer system or executed by a processor. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

Although exemplary embodiments have been described, it shall be appreciated that a variety of permutations and modifications to the exemplary embodiments are possible by those who are ordinarily skilled in the art without departing from the technical ideas and scopes of the exemplary embodiments which shall be defined by the claims appended below.

What is claimed is:

1. A method for testing a signal reception sensitivity of a wireless access point apparatus, comprising operations of:
   (a) transmitting a test packet from a first access point apparatus, as a transmission access point (AP), to a second access point apparatus, as a reception AP, the test packet being transmitted at a predetermined first transmission power level;

(b) measuring a packet error rate of the test packet and writing a Modulation and Coding Scheme (MCS) level applied to the test packet, the packet error rate being measured and the MCS level being written by the second access point apparatus;

(c) transmitting a request for changing a transmission power level by increasing the transmission power level for retransmitting the test packet from the second access point apparatus to the first access point apparatus, in response to a completion of the measuring and the writing in operation (b);

(d) retransmitting the test packet at a changed transmission power level from the first access point apparatus to the second access point apparatus;

(e) repeating operations (b) to (d) until the changed transmission power level reaches a predetermined second transmission power level; and (f) transmitting a test target AP switching request signal from the second access point apparatus to the first access point apparatus after operations (a) to (e), and in response to the test target AP switching request signal, repeating operations (a) to (e) with respect to the second access point apparatus as the transmission AP and the first access point apparatus as the reception AP.

2. The method of claim 1, wherein the repeating operations (a) to (e) with respect to the second access point apparatus as the transmission AP and the first access point apparatus as the reception AP comprises operations:

(g) transmitting the test packet from the second access point apparatus to the first access point apparatus at a predetermined third transmission power level after transmitting the test target AP switching request signal;

(h) measuring the packet error rate of the test packet transmitted in operation (g) and writing the Modulation and Coding Scheme (MCS) level applied to the test packet transmitted in the operation (g), the packet error rate being measured and the MCS level being written by the first access point apparatus;

(i) transmitting the request for changing the transmission power level for retransmitting the test packet from the first access point apparatus to the second access point apparatus;

(j) retransmitting the test packet at the changed transmission power level from the second access point apparatus to the first access point apparatus; and (k) repeating operations (h) to (j) until the changed transmission power level reaches a predetermined fourth transmission power level.

3. The method of claim 2, wherein operation (h) further comprises:

measuring a reception power after receiving the test packet transmitted in said operation (g), the reception power being measured by the first access point apparatus; and evaluating a signal reception sensitivity of the first access point apparatus based on whether the packet error rate of the test packet of the received MCS level is smaller than or equal to a predetermined reference value for the measured reception power, the signal reception sensitivity being evaluated by the first access point apparatus.

4. The method of claim 3, wherein the operation (h) further comprises:

checking for a variable MCS level in the measured reception power level based on a pre-stored MCS table if the packet error rate of the test packet received by the first access point apparatus is smaller than or equal to the predetermined reference value, the variable MCS level being checked for by the first access point apparatus, wherein operation (i) further comprises transmitting information on the variable MCS level from the first access point apparatus to the second access point apparatus, and wherein operation (j) further comprises changing an MCS level to apply to the test packet based on the received information on the MCS level, the MCS level being changed by the second access point apparatus.

5. The method of claim 1, wherein said operation (b) further comprises:

measuring a reception power after receiving the test packet, the reception power being measured by the second access point apparatus; and evaluating a signal reception sensitivity of the second access point apparatus based on whether the packet error rate of the test packet of the MCS level is smaller than or equal to a predetermined reference value for the measured reception power.

6. The method of claim 5, wherein said operation (b) further comprises checking for a variable MCS level in the measured reception power level based on a pre-stored MCS table if the packet error rate is smaller than or equal to the predetermined reference value, the variable MCS level being checked for by the second access point apparatus, wherein operation (c) comprises transmitting information on the variable MCS level from the second access point apparatus to the first access point apparatus, and wherein operation (d) comprises changing an MCS level to apply to the test packet based on the received information on the MCS level, the MCS level being changed by the first access point apparatus.

7. The method of claim 1, wherein the first access point apparatus and the second access point apparatus are configured to communicate wirelessly and are connected by a wired network.

8. The method of claim 7, wherein the first access point apparatus and the second access point apparatus are connected by a wireless local area network.

9. The method of claim 8, wherein the first access point apparatus and the second access point apparatus are adjacent to each other.

10. The method of claim 7, further comprising, prior to the transmitting the test packet from the first access point apparatus to the second access point apparatus, transmitting a switching request signal from the first access point apparatus to the second access point apparatus.

11. The method of claim 10, wherein the transmitting the test packet from the first access point apparatus to the second access point apparatus is performed in response to the transmitting the switching request signal from the first access point apparatus to the second access point apparatus.

12. The method of claim 7, further comprising, prior to the transmitting the test packet from the first access point apparatus to the second access point apparatus, transmitting a test start request signal from the second access point apparatus to the first access point apparatus.

13. The method of claim 12, wherein the transmitting the test packet from the first access point apparatus to the second access point apparatus is in response to the transmitting the test start request signal from the second access point apparatus to the first access point apparatus.

14. The method of claim 1, wherein the retransmitting the test packet is performed independent from the packet error rate measured by the second access point apparatus.

15. A wireless access point apparatus, comprising:
a receiver which is configured to, in a transmission mode of the wireless access point apparatus, receive a test start request signal, a transmission power level change request signal and a test packet retransmission request signal from a neighboring access point apparatus;
a non-transitory computer readable medium configured to store instructions that, when executed by a processor, cause the processor to:
generate a test packet signal to be transmitted to the neighboring access point apparatus; and
adjust a transmission power level of the test packet signal; and
a transmitter which is configured to, in the transmission mode, transmit the test packet signal to the neighboring access point apparatus at the adjusted transmission power level;
wherein the receiver, the transmitter, and the processor are configured to, in the transmission mode, execute a test program having a test sequence for testing a signal reception sensitivity of the neighboring access point apparatus, the test sequence comprising:
controlling the transmitter to transmit a test packet to the neighboring access point apparatus at power having a predetermined first transmission power level in response to receiving the test start request signal; and
changing the transmission power level of the test packet by increasing the transmission power level based on the test program and retransmitting the test packet having the changed transmission power level to the neighboring access point apparatus, in response to receiving the transmission power level change request signal and the test packet retransmission request signal from the neighboring access point apparatus which previously received the test packet,
wherein the wireless access point apparatus switches from the transmission mode to a reception mode in response to receiving a test target AP switching request signal from the neighboring access point apparatus,
wherein, in the reception mode, the transmitter transmits the test start request signal, the transmission power level change request signal and the test packet retransmission request signal to the neighboring access point apparatus, and the receiver receives the test packet signal from the neighboring access point apparatus.

16. The wireless access point apparatus of claim 15, wherein the non-transitory computer readable medium is further configured to store instructions that, when executed by the processor, cause the processor to:
measure a reception power after receiving the test packet and measure a packet error rate of the test packet if the receiver receives the test packet from the neighboring access point apparatus;
record a Modulation and Coding Scheme (MCS) level applied to the test packet; and
evaluate a signal reception sensitivity based on whether the packet error rate of the test packet of the MCS level is smaller than or equal to a predetermined reference value for the measured reception power.

17. The wireless access point apparatus of claim 16, wherein, in case the packet error rate has a value that is smaller than or equal to the predetermined reference value, the non-transitory computer readable medium is further configured to store instructions, when executed by the processor, cause the processor to check for a variable MCS level that is applicable for the measured reception power level, based on a pre-stored MCS table.

18. The wireless access point apparatus of claim 17, wherein the non-transitory computer readable medium is further configured to instructions to store instructions, when executed by the processor, cause the processor to control the transmitter to transmit information on the variable MCS level to the neighboring access point apparatus.

19. The wireless access point apparatus of claim 15, wherein the processor comprises at least one hardware component.

20. A method for testing a signal reception sensitivity of a wireless access point apparatus, comprising operations:
(a) transmitting a test packet from a first access point apparatus to a second access point apparatus, the test packet being transmitted at a predetermined first transmission power level;
(b) measuring a packet error rate of the test packet and writing a Modulation and Coding Scheme (MCS) level applied to the test packet, the packet error rate being measured and the MCS level being written by the second access point apparatus;
(c) transmitting a request for changing a transmission power level for retransmitting the test packet from the second access point apparatus to the first access point apparatus in response to the measuring and the writing in operation (b) being completed;
(d) retransmitting the test packet at a changed transmission power level from the first access point apparatus to the second access point apparatus; and
(e) repeating operations (b) to (d) until the changed transmission power level reaches a predetermined second transmission power level,
wherein after operations (a) to (e), the method further comprises:
(f) transmitting a test target access point (AP) switching request signal from the second access point apparatus to the first access point apparatus;
(g) transmitting the test packet from the second access point apparatus to the first access point apparatus at a predetermined third transmission power level after transmitting the test target AP switching request signal;
(h) measuring the packet error rate of the test packet transmitted in operation (g) and writing an MCS level applied to the test packet transmitted in the operation (g), the packet error rate being measured and the MCS level being written by the first access point apparatus;
(i) transmitting the request for changing the transmission power level for retransmitting the test packet from the first access point apparatus to the second access point apparatus;
(j) retransmitting the test packet at the changed transmission power level from the second access point apparatus to the first access point apparatus; and
(k) repeating operations (h) to (j) until the changed transmission power level reaches a predetermined fourth transmission power level.

* * * * *